United States Patent
King et al.

(10) Patent No.: US 9,634,519 B2
(45) Date of Patent: Apr. 25, 2017

(54) ADJUSTABLE AND PORTABLE MOUNTING SYSTEM FOR A TABLET COMPUTING DEVICE AND SOLAR BASED CHARGING SYSTEM

(71) Applicant: The MITRE Corporation, McLean, VA (US)

(72) Inventors: Andrew D. King, Bedford, MA (US); Jamie R. Hood, Cambridge, MA (US); Matthew D. Patron, Chelmsford, MA (US); Steven M. Taskovics, Framingham, MA (US)

(73) Assignee: MITRE CORPORATION, McLean, VA (US)

( * ) Notice: Subject to any disclaimer, the term of this patent is extended or adjusted under 35 U.S.C. 154(b) by 706 days.

(21) Appl. No.: 13/970,159

(22) Filed: Aug. 19, 2013

(65) Prior Publication Data

US 2014/0326840 A1    Nov. 6, 2014

Related U.S. Application Data

(60) Provisional application No. 61/819,445, filed on May 3, 2013.

(51) Int. Cl.
*A47F 5/00* (2006.01)
*A47F 7/00* (2006.01)
(Continued)

(52) U.S. Cl.
CPC ............ *H02J 7/355* (2013.01); *G06F 1/1635* (2013.01); *G06F 1/263* (2013.01); *H02J 7/35* (2013.01);
(Continued)

(58) Field of Classification Search
CPC .... F16M 11/10; F16M 13/00; F16M 11/2021; F16M 11/04; A47B 23/042; A47B 97/08;
(Continued)

(56) References Cited

U.S. PATENT DOCUMENTS 3,140,558 A  *  7/1964  Cassidy ............... A47B 23/043
                                                              248/448
5,630,566 A  *  5/1997  Case .................... A47B 23/046
                                                              248/122.1
(Continued)

FOREIGN PATENT DOCUMENTS

WO    WO 2012016158 A2  *  2/2012  ........... F16M 11/041

OTHER PUBLICATIONS

Notification of Transmittal of the International Search Report and the Written Opinion of the International Searching Authority directed toward related International Application No. PCT/US2014/035692, mailed Aug. 27, 2014, 12 pages.

*Primary Examiner* — Brian Mattei
*Assistant Examiner* — Taylor Morris
(74) *Attorney, Agent, or Firm* — Sterne, Kessler, Goldstein & Fox P.L.L.C.

(57) ABSTRACT

An adjustable and portable mounting system for a tablet computing device and solar based charging system is described. An example mounting system for a tablet computing device includes a tablet enclosure with a plurality of gripping portions adjustable to hold tablets with different sizes and shapes, and each gripping portion is configured to grip a corner of the tablet computing device. The mounting system further includes an adjustable solar panel support, which is pivotally attached to the tablet enclosure and where a solar panel placed within the support can be configured to provide trickle charging to the tablet and to orient 360 degrees about three axes of rotation. The mounting system also includes a table stand, which is mounted to the tablet (Continued)

enclosure and provides support of the tablet computing device on a flat surface with a wide range of viewing angles. The mounting system also includes a connector configured to couple to a tripod stand mount, or a similar device.

15 Claims, 9 Drawing Sheets

(51) Int. Cl.

| | |
|---|---|
| *F16M 11/00* | (2006.01) |
| *F16M 13/00* | (2006.01) |
| *G06F 1/16* | (2006.01) |
| *H02J 7/35* | (2006.01) |
| *G06F 1/26* | (2006.01) |
| *A47B 19/00* | (2006.01) |
| *A47B 23/00* | (2006.01) |
| *A47B 97/04* | (2006.01) |
| *A47G 1/24* | (2006.01) |
| *H01M 10/44* | (2006.01) |
| *H02J 7/14* | (2006.01) |
| *H05K 5/00* | (2006.01) |
| *H05K 7/00* | (2006.01) |
| *F16M 11/04* | (2006.01) |
| *F16M 11/10* | (2006.01) |
| *F16M 11/20* | (2006.01) |

(52) U.S. Cl.
CPC .............. *F16M 11/04* (2013.01); *F16M 11/10* (2013.01); *F16M 11/2021* (2013.01); *F16M 13/00* (2013.01); *G06F 1/1601* (2013.01); *G06F 1/166* (2013.01); *G06F 1/1616* (2013.01)

(58) Field of Classification Search
CPC ...... G06F 1/1601; G06F 1/1616; G06F 1/166; G06F 1/1635; G06F 1/26; G06F 1/263
USPC .... 248/441.1, 444, 447, 454, 455, 460, 462, 248/122.1, 154.1, 125.7; 361/679.32, 361/679.55; 320/101, 114

See application file for complete search history.

(56) References Cited

U.S. PATENT DOCUMENTS

| | | | | |
|---|---|---|---|---|
| 5,814,906 | A * | 9/1998 | Spencer | G06F 1/1601 136/245 |
| 6,604,720 | B1 * | 8/2003 | Wilson | A47B 23/04 248/177.1 |
| 7,380,765 | B2 * | 6/2008 | Shiff | A47B 97/04 248/124.1 |
| 7,611,112 | B2 * | 11/2009 | Lin | B60R 11/02 248/274.1 |
| 7,984,886 | B2 * | 7/2011 | Lin | B60R 11/0252 108/44 |
| 8,413,943 | B1 * | 4/2013 | Li | F16M 11/041 248/292.12 |
| 2007/0159784 | A1 | 7/2007 | Chen et al. | |
| 2009/0152428 | A1 * | 6/2009 | Cilia | B60R 11/02 248/346.03 |
| 2010/0108828 | A1 | 5/2010 | Yu et al. | |
| 2010/0154860 | A1 * | 6/2010 | Fereday | F16M 11/10 136/245 |
| 2011/0297711 | A1 * | 12/2011 | Yu | A45F 5/00 224/272 |
| 2012/0026684 | A1 * | 2/2012 | Matthews | F16M 11/041 361/679.58 |
| 2012/0110354 | A1 | 5/2012 | Liu | |
| 2013/0016469 | A1 * | 1/2013 | Galerne | G06F 1/1656 361/679.21 |
| 2013/0026324 | A1 | 1/2013 | Fischer et al. | |
| 2013/0153720 | A1 * | 6/2013 | Petruskavich | F16M 11/041 248/187.1 |

* cited by examiner

ADJUSTABLE AND PORTABLE MOUNTING SYSTEM FOR A TABLET COMPUTING DEVICE AND SOLAR BASED CHARGING SYSTEM

BACKGROUND

Field

The embodiments generally relate to a tablet mounting system, particularly in a stressed, mobile, and/or outdoor computing environment.

Background Art

Tablet computing devices are widely used in a variety of applications ranging from personal use to commercial advertising to long-running data processing. As tablet computing devices become more powerful, there is an increasing need for tablet mounting and charging systems to support these types of applications.

The proposed embodiments render a design where a variety of flexible mounting options can be exercised, whether on a table or on a stand. Furthermore, the embodiments incorporate the ability to mount a charging system for supplying a continuous charge (e.g. trickle charging) to the tablet computer device both in use and when folded, while disconnected from a hard-wired power supply. Finally, the embodiments are adjustable to adapt to various sizes and configurations of the tablet computing devices. As a result, it provides a mounting system to support the many uses of tablet computing devices.

BRIEF SUMMARY

Embodiments relate to an adjustable and portable mounting system for a tablet computing device and solar based charging system. In an embodiment, a mounting system for a tablet computing device includes a tablet enclosure with a base plate. The tablet enclosure has a plurality of gripping portions adjustable to hold tablets of various sizes and shapes, and each gripping portion is configured to grip a corner of the tablet computing device. The mounting system further includes an adjustable solar panel support, which is pivotally attached to the tablet enclosure and where a solar panel mounted within the solar panel support can be configured to provide a continuous trickle charge to the tablet and to orient 360 degrees about three axes of rotation. The mounting system also includes a table stand, which is mounted to the tablet enclosure and provides support of the tablet computing device on a flat surface with a wide range of viewing angles.

In another embodiment, a mounting system for a tablet computing device includes a solar panel support having a first clip configured to grip a side of a solar panel, and a second clip configured to grip an opposite side of the solar panel. The first clip is adjustably coupled to the second clip through a beam member having a knob and a track, and the knob is slidable in the track to adjust a distance between the first clip and the second clip relative to each other, such that the solar panel support is adjustable by hand to support solar panels of various sizes and configurations. The mounting system further includes a tablet enclosure having four gripping portions connecting to four beam members of the table enclosure, where each beam member of the tablet enclosure is adjustable by hand such that each gripping portion is to hold a corner of the tablet computing device, and the tablet enclosure is configured to hold tablets with different sizes and shapes. The mounting system also includes a cylindrical connector attached to a back plate of the tablet enclosure to which a tubular interface is clamped that is configurable, through a threaded end cap, to couple to a tripod stand mount, vehicle mount, or other similar type of support. Furthermore, the mounting system includes a table stand mounted to the tablet enclosure through a picture frame mount, where the tablet stand provides support of the tablet on a flat surface. Finally, the solar panel support is coupled to the tablet enclosure through a plurality of friction hinges to configure a solar panel mounted within the solar panel support, wherein the solar panel is configured to provide a continuous trickle charge to the tablet computing device, and the friction hinges provide 360 degrees of adjustable orientation of the solar panel around three axes of rotation, thereby enabling the solar panel to orient in any position based on the angles of the light source.

Further embodiments, features, and advantages of embodiments of the present invention, as well as the structure and operation of the various embodiments, are described in detail below with reference to the accompanying drawings. It is noted that the invention is not limited to the specific embodiments described in this application. Such embodiments are presented for illustrative purposes only. Additional embodiments will be apparent to persons skilled in the relevant art(s) based on the information contained in this document.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

The accompanying drawings, which are incorporated herein and form part of the specification, illustrate the embodiments of the present invention and, together with the description, further serve to explain the principles of embodiments and to enable a person skilled in the relevant art(s) to make and use such embodiments.

DETAILED DESCRIPTION

Embodiments relate to adjustable and portable mounting systems for a tablet computing device and solar based charging system. Unlike conventional systems which merely serve as a car mount, stand mount, or a table mount, the adjustable and portable mounting system, described in embodiments herein, is capable of providing dual functionality of a table mount and tripod stand mount using the same system.

As will be described in further detail below, embodiments have a stored configuration, a table mount configuration and a tripod mount configuration. Embodiments can implement full portability through its continuous trickle charging to the tablet computing device in all three configurations when disconnected from a hardwired power supply. Trickle charging means providing a continuous charging capability to a battery of the tablet computing device, thus enabling the battery to remain at its fully charged level, or to slow down power drain from long-running data processing and other like services on the tablet.

Embodiments further offer full adjustability to the solar panel support, such that the solar panel within the solar panel support can be oriented 360 degrees to accommodate the source of light based on time of the day and season of the year, as well as the position and orientation of the tablet. Embodiments also offer full adjustability to the picture frame stand so that the tablet can be viewed at a wide range of angles in its table mount configuration.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

Figure 1:
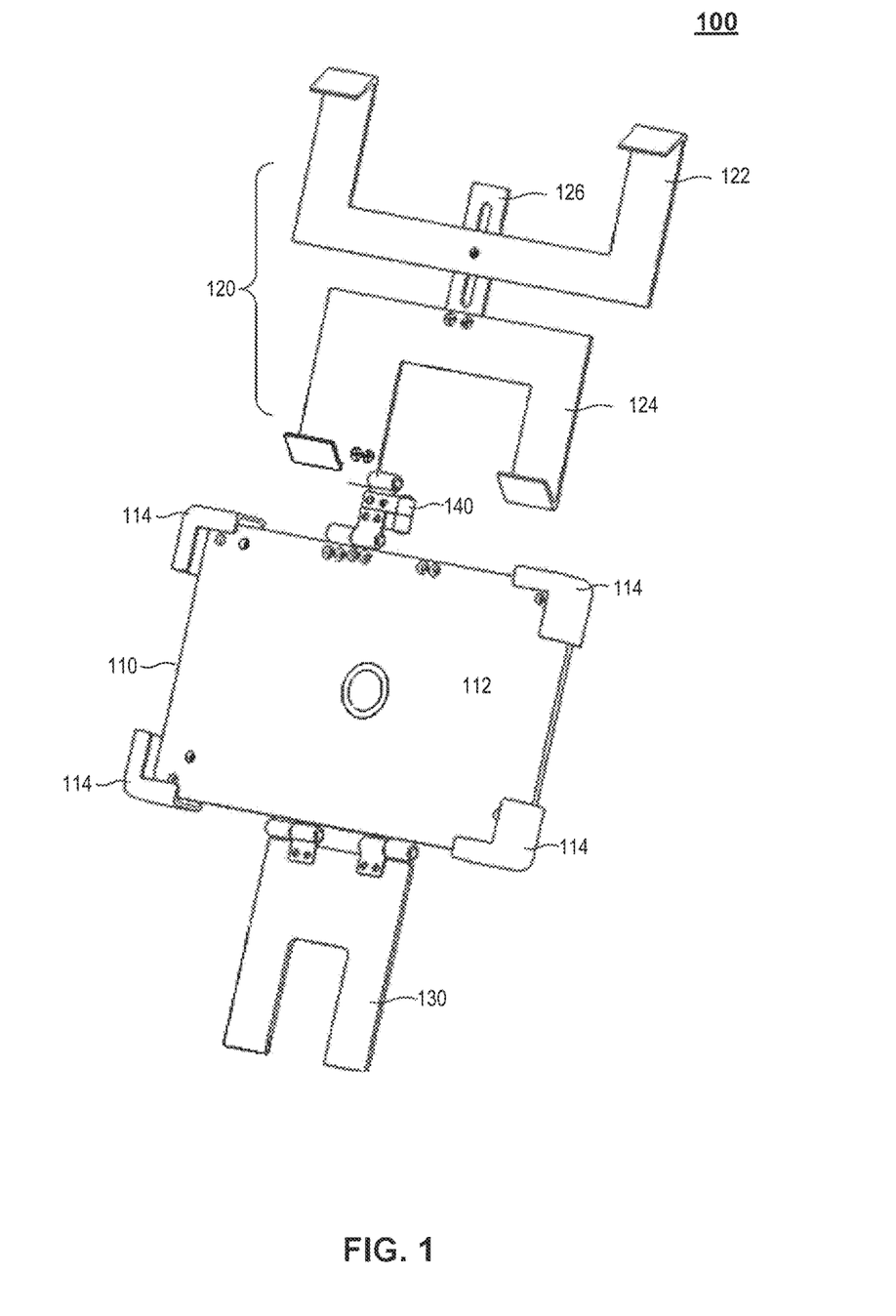
FIG. 1 is a front view of a tablet mounting system, according to an embodiment.

FIG. 1 is a front view of the tablet mounting system, according to an embodiment. System 100 includes a tablet enclosure 110, a solar panel support 120, and a table stand 130.

Tablet enclosure 110 includes a base plate 112 and four gripping portions 114. Base plate 112 provides support for a tablet computing device when it is placed within tablet enclosure 110, while gripping portions 114 hold four corners of the tablet computing device. Because each gripping portion 114 can be adjusted by hand to change the distance from one gripping portion 114 relative to another (see FIG. 2 for details), tablet enclosure 110 is adaptive to hold tablets of different sizes, types and configurations. In one embodiment, tablet enclosure 110 may hold tablets such as an iPad, a Kindle Fire, a Galaxy or a Nexus, ranging from 7 to 10 inches. Smaller sizes are also possible. In another embodiment, tablet enclosure 110 may hold tablets used in a store front for marketing or customer research, which potentially have a much larger size. In still another embodiment, as the tablet computing devices become more powerful, they may serve in a server-oriented data processing environment or in data center like capacities. Accordingly, such server-like tablet computing devices may have a drastically different sizes and configurations than that of tablets suitable for personal computing. Gripping portion 114 may be reinforced by foam paddings for additional protection of the tablet computing devices, given that the four corners of the tablet are most vulnerable to external impact or damages during the transportation, storage and usage of the tablet computing devices.

Solar panel support 120 may include a first or upper clip 122 and a second or lower clip 124. In the example illustrated in FIG. 1, clips 122 and 124 are coupled together by a beam member 126, which will be described in detail in FIG. 2. Clips 122 and 124 may be configured to hold two opposite sides of the solar panel. Due to the fact that the distance of clip 122 from clip 124 is adjustable by beam member 126, solar panel support 120 may be adapted to hold a range of sizes of solar panels.

Solar panel support 120 may be pivotally attached to tablet enclosure 110 via a set of friction hinges 140. For example, friction hinge 140 may include a three-hinge system, which provides enormous flexibility and adjustability. Because there is no limitation to the direction and orientation of rotation provided by friction hinges 140, solar panel support 120 may be oriented 360 degrees about three axes of rotation. Depending on the time of the day and season of the year, solar panel support 120 may be oriented according to the various angles of the light source. Furthermore, solar panel support 120 may be rotated in any position relative to tablet enclosure 110. For example, in a stored configuration when the tablet is mounted within tablet enclosure 110, but is not in use, solar panel and its support 120 may be rotated anteriorly to overlap with the tablet and simultaneously serve as the protective front cover for tablet enclosure 110. In another example, when the tablet is mounted in a table mount configuration, solar panel support 120 may be oriented to the posterior position of tablet enclosure 110, parallel to table stand 130 and provide additional support and stability to the tablet computing devices that rest on a flat surface. The three hinge system may also provide additional axes of rotation to allow for a portrait orientation of the tablet computing device.

Solar panels to be installed in solar panel support 120 may include any packaged, connected assembly of photovoltaic cells, which generate and supply electricity to the tablet computing device. In some embodiments, where the tablet computing device serves in a pseudo-server capacity, a solar tracker can be installed to the mounting system. In such systems, the solar tracker may sense the direction of the sun and adjust the three hinge system to orient the solar panel as needed for maximum exposure to the light source.

Figure 2:
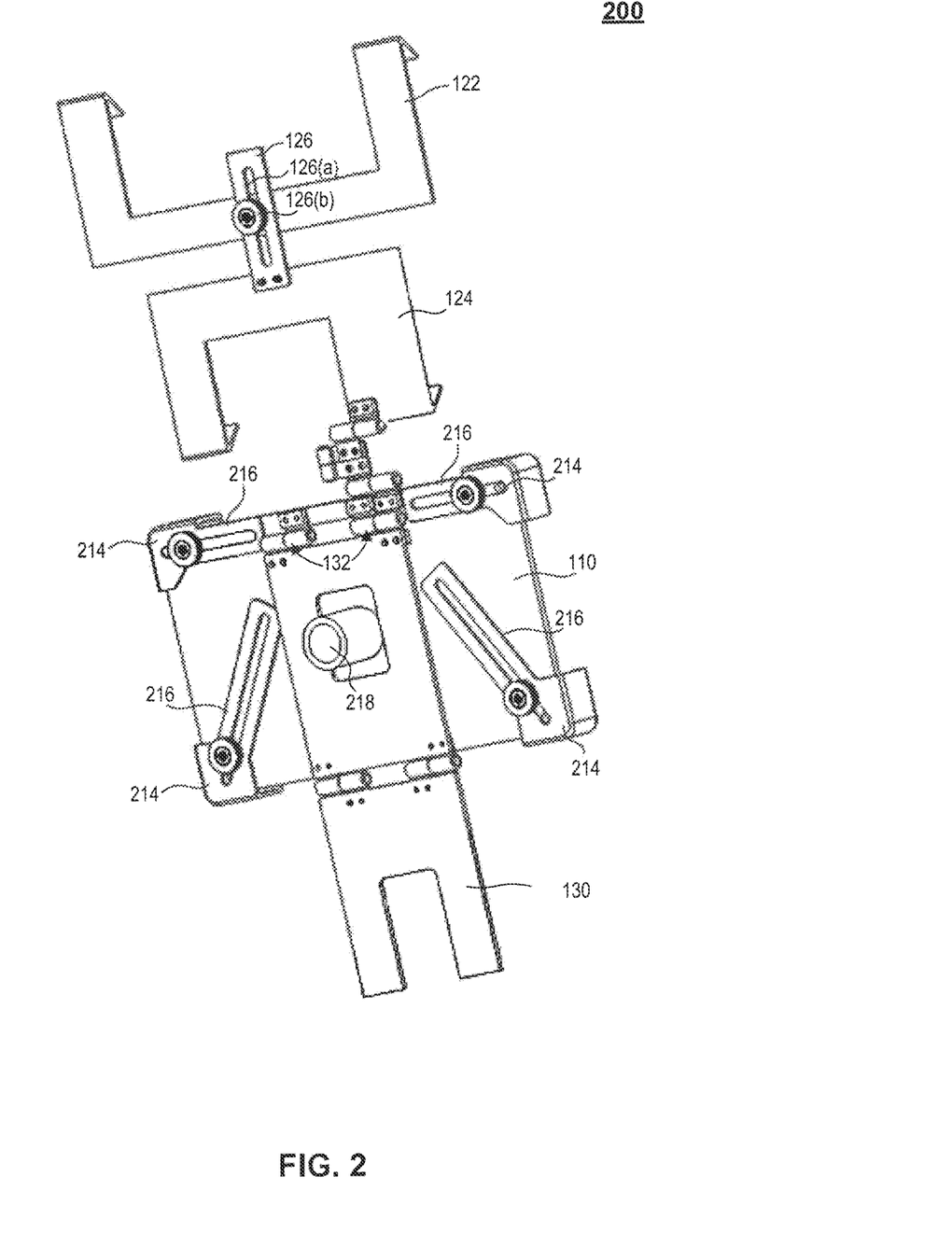
FIG. 2 is a rear view of a tablet mounting system, according to an embodiment.

FIG. 2 is a rear view of the tablet mounting system, according to an embodiment. In the example shown in FIG. 2, there are five beam members 126 and 216. All beam members 126 and 216 contain a common structure, for example, a track 126(a) and a knob 126(b). Knob 126(b) may be a knurled nut slidable in track 126(a) to adjust the distance of the structures attached to them relative to each other.

Table stand 130 may be connected to tablet enclosure 110 via friction hinges 132. According to one embodiment, table stand 130 may have the similar structure of a picture frame stand for support of tablet enclosure 110 on a flat surface. Friction hinges 132 may support the tablet enclosure at a wide range of viewing angles.

Beam member 126 is coupled to clips 122 and 124, with one end of the beam member attached, for example, to clip 124, while knob 126(b) is attached to another clip 122. Because knob 126(b) can be slide-adjusted in track 126(a), the distance from clip 122 to clip 124 can be adjusted accordingly, enabling solar panel support 120 to be adapted to solar panels of various sizes and configurations.

Likewise, beam members 216, which are attached to gripping portions 214 of tablet enclosure 110, are adjustable in the same manner to be adaptive to hold tablets of various sizes and configurations. For example, a 7 inch tablet may require the knob to be adjusted in a position relatively closer to gripping portion 214, where its corresponding beam member 216 is attached to. In another example, a 10 inch tablet may require the knob to be adjusted in a position relatively further away from gripping portion 214, where its corresponding beam member 216 is attached to. According to one embodiment, because the knob is easily slidable by hand in the track of the beam member, tablet enclosure 110 can be manually adjusted to accommodate tablets of various sizes and configurations without the need to use any specialized tools.

Notably, tablet enclosure 110 also includes a connector 218, which may be configured to be attached to a back plate of tablet enclosure 110, and connected to a stand mount, such as a tripod stand mount. In one embodiment, connector 218 may be a cylindrical connector providing quick connection to a tripod stand using a quick release seat post clamp, or similar device. Thus, the tablet computing devices may be flexibly mounted to a table stand or a tripod stand using the same mounting system.

Figure 3A:
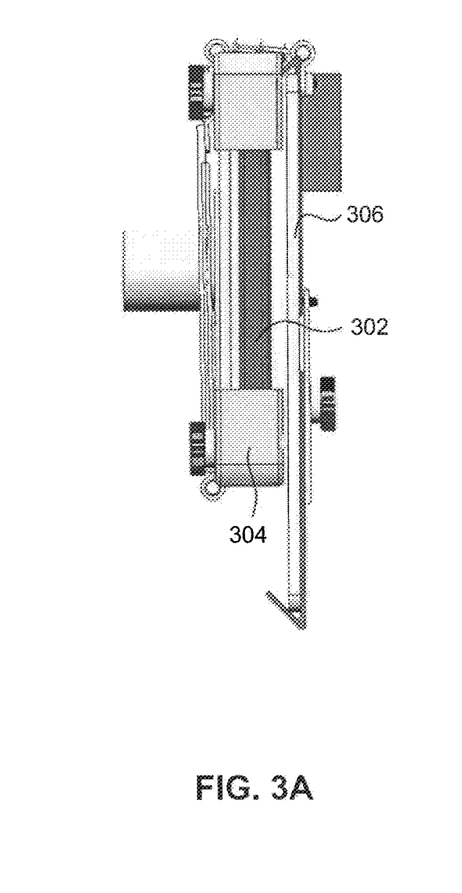
FIGS. 3A-B are side and perspective views of a tablet mounting system in a stored or fully folded configuration, according to an embodiment.
Figure 3B:
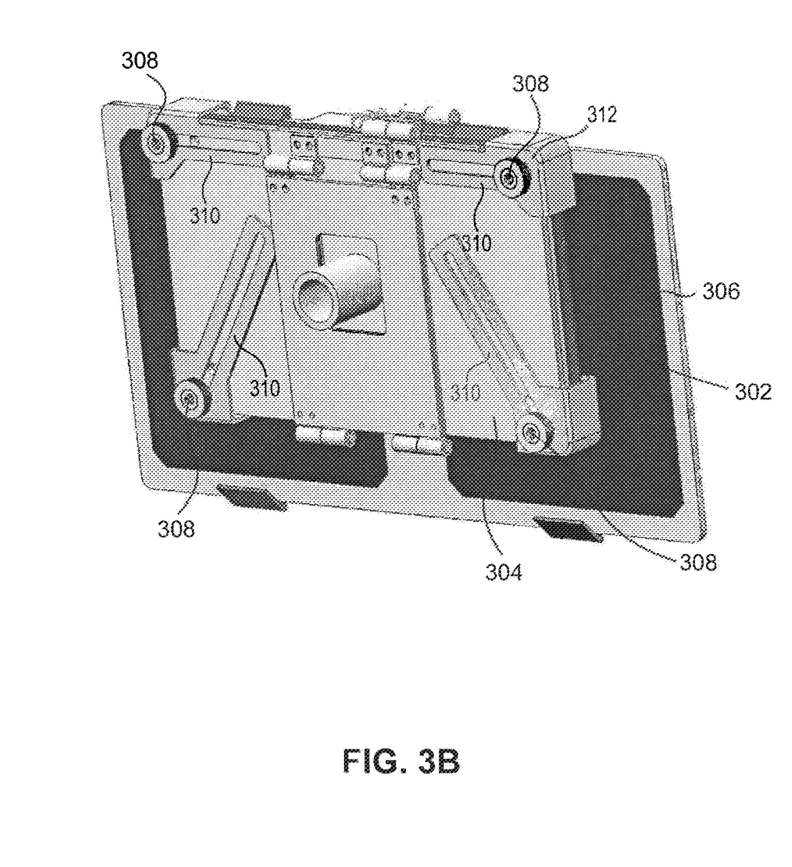

FIGS. 3A-B are side and perspective views of the tablet mounting system in a stored configuration, according to an embodiment. For example, FIGS. 3A-B illustrate the mounting system suitable for mounting a 7 inch tablet. In the side view shown in FIG. 3A, tablet 302 is placed within tablet enclosure 304 in a stored configuration. Solar panel 306 is folded in an anterior position of tablet 302, serving as a front cover of tablet enclosure 304, while providing trickle charging to tablet 302 minimizing the need to be connected to a hard-wired power supply, depending on the orientation of a solar panel mounted within the solar panel support.

In the perspective view shown in FIG. 3B, tablet 302 is placed within tablet enclosure 304 in a stored configuration, with solar panel 306 serving as a front cover. Because the tablet, such as a 7 inch one, is relatively small in size, knob 308 on beam member 310 is placed in a position relatively close to its corresponding gripping portion 312 on tablet enclosure 304.

Figure 4A:
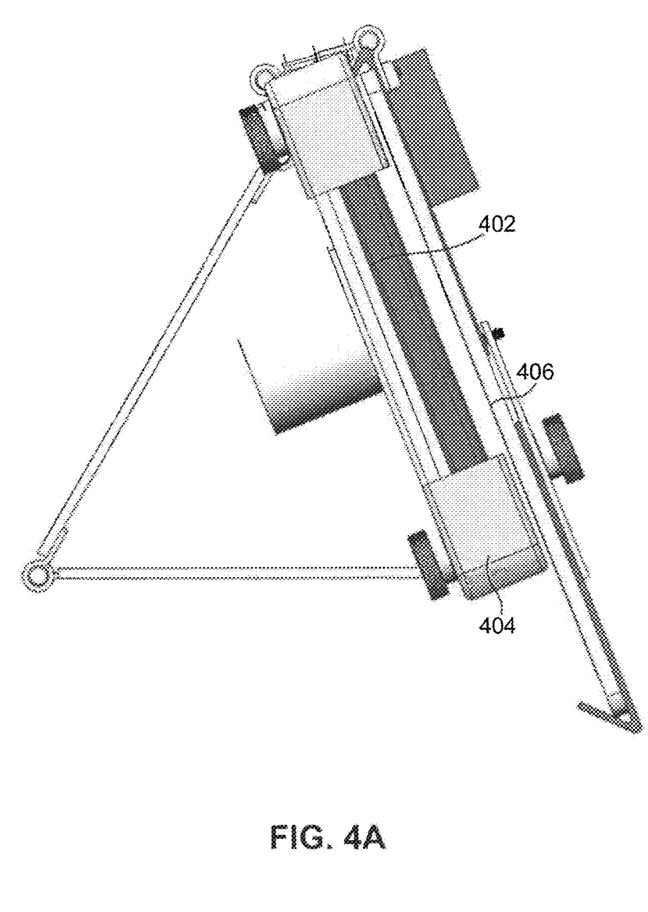
FIGS. 4A-B are side and perspective views of a tablet mounting system in a table mount configuration, according to an embodiment.
Figure 4B:
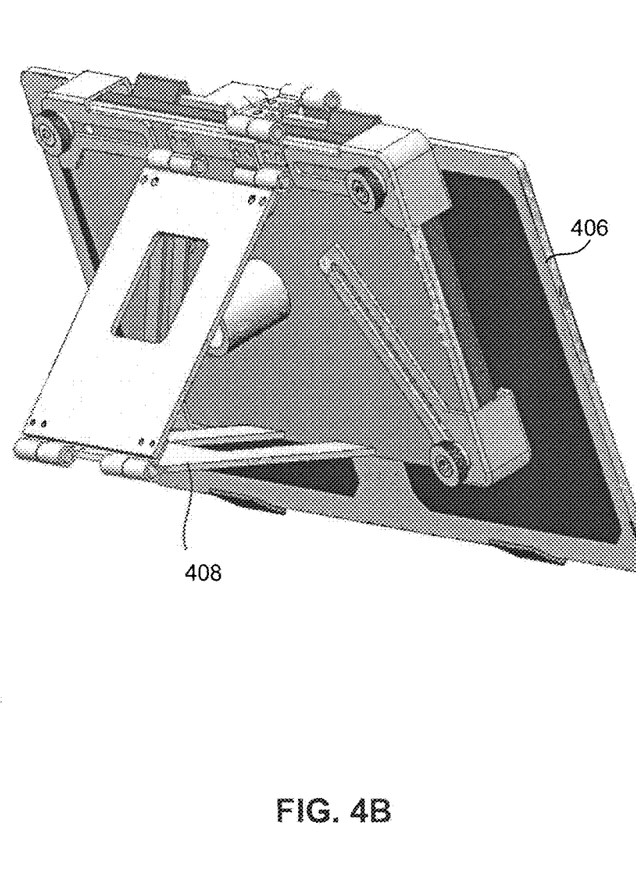

FIGS. 4A-B are side and perspective views of the tablet mounting system in a table mount configuration, according to an embodiment. For example, FIGS. 4A-B illustrate a mounting system suitable for mounting a 7 inch tablet in a table mount configuration. In the side view shown in FIG. 4A, tablet 402 is placed within tablet enclosure 404 in a table mount configuration. Solar panel 406 is folded in an anterior position of tablet 402, serving as a front cover of tablet enclosure 404, while providing trickle charging to tablet 402 minimizing the need to be connected to a hard-wired power supply, depending on the orientation of a solar panel mounted within the solar panel support.

In the perspective view shown in FIG. 4B, tablet 402 is placed within tablet enclosure 404 in a table mount configuration, with solar panel 406 serving as a front cover. Because the tablet, such as a 7 inch one, is relatively small in size, table stand 408 is in a folded position, connected by a fiction hinge. In one embodiment, the table stand is a picture frame stand. The "stand bottom" footprint of the picture frame stand may be increased to provide additional support and stability for larger and heavier tablets.

Figure 5A:
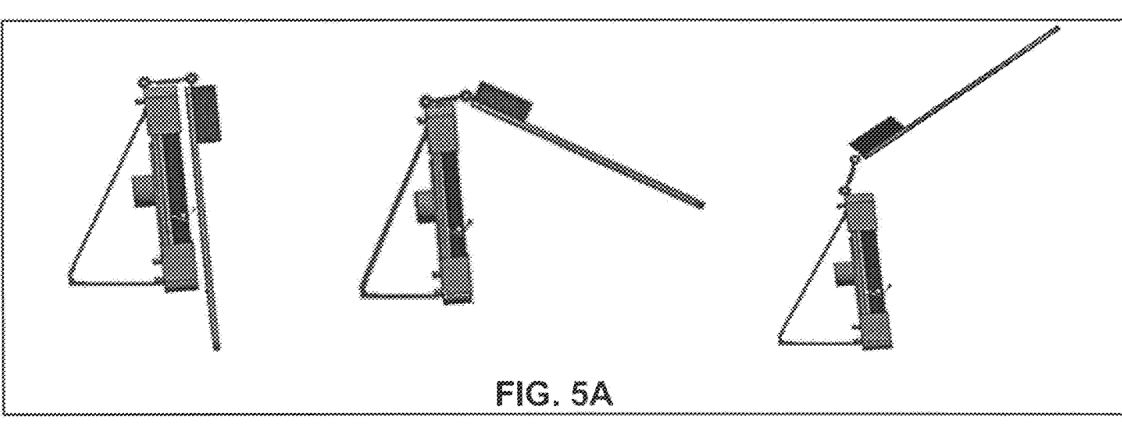
FIGS. 5A-B are side views of a tablet mounting system in a table mount configuration showing the various positions of the solar panel, according to an embodiment.
Figure 5B:
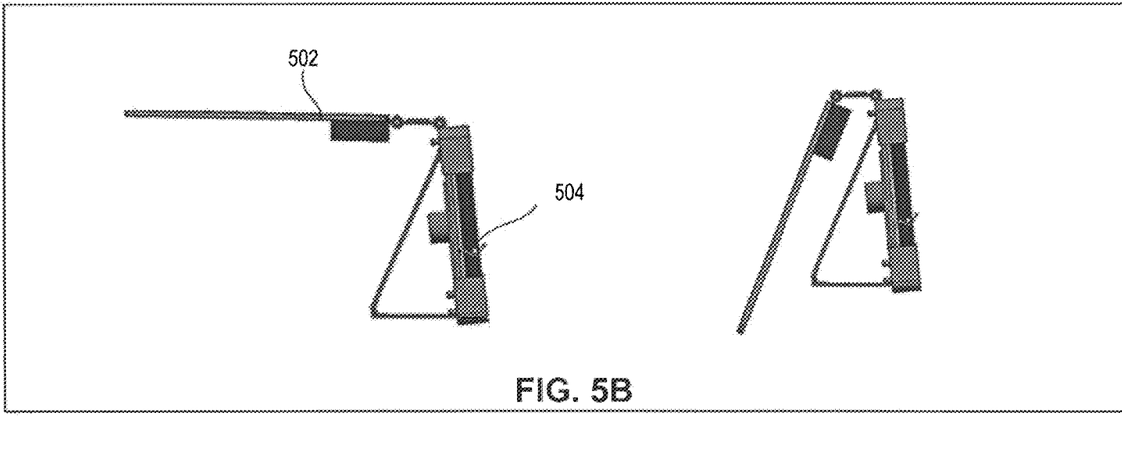

FIGS. 5A-B are side views of the tablet mounting system in a table mount configuration showing various positions of the solar panel, according to an embodiment. As discussed above in FIG. 1, the three hinge system connecting solar panel support 502 and tablet enclosure 504 offers enormous flexibility and adjustability, and thus enables the solar panel to be oriented in unlimited positions suitable for the maximum exposure to the source of light. FIGS. 5A-B illustrate the flexibility of 360 degrees of rotation about one axis of rotation of the solar panel relative to tablet enclosure 504. For example, solar panel may be oriented anterior to tablet enclosure 504, while serving as the front cover of tablet enclosure 504 in the stored configuration. In another example, solar panel may be oriented posterior to tablet enclosure 504, serving as a reinforcement of the table stand of tablet enclosure 504 in the table mount configuration. FIGS. 5A-B also illustrate that the solar panel can be disposed in any angle and position between the stored configuration and the table mount configuration. For example, solar panel may be disposed horizontally in a table mount configuration. Rotation of 360 degrees about two additional axes can be implemented by a set of friction hinges 140 as illustrated in FIGS. 9A and 9B.

Figure 9A:
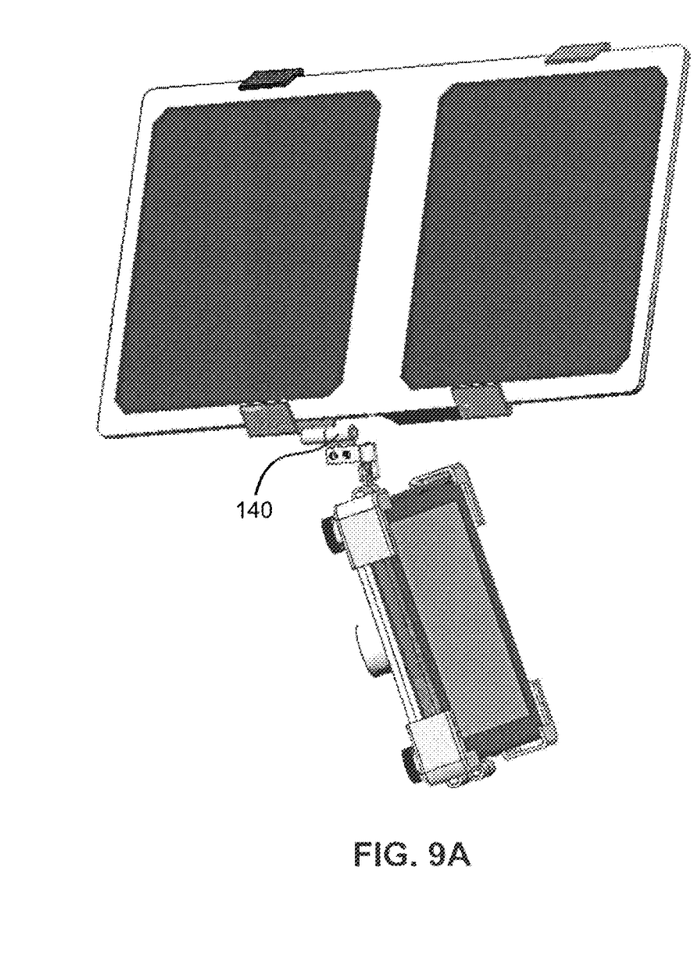
FIGS. 9A-B are side and front views of a tablet mounting system showing the orientation of the solar panel, according to an embodiment.
Figure 9B:
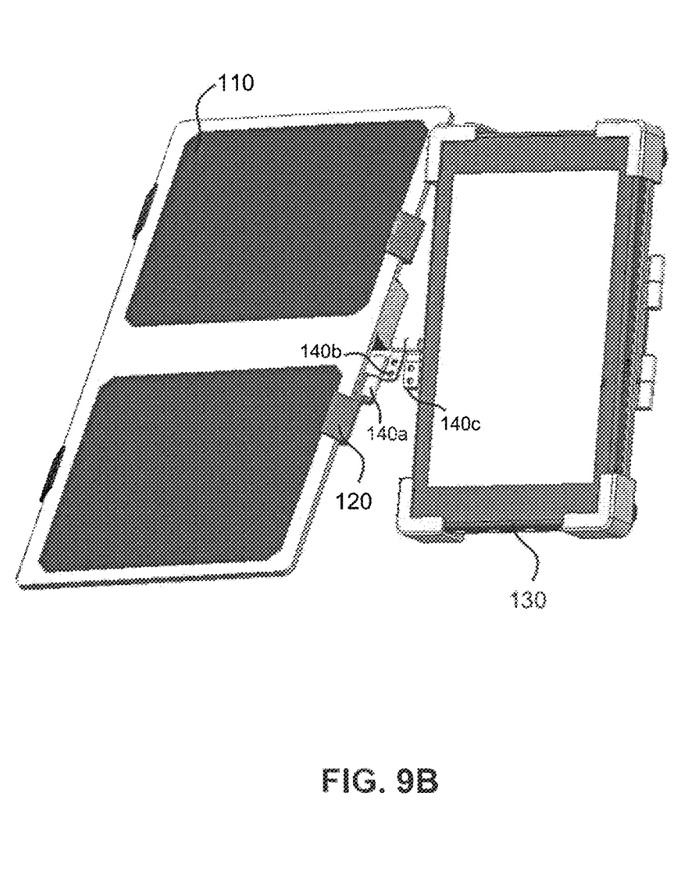

FIGS. 9A-B are side and front views of a tablet mounting system showing the orientation of the solar panel, according to an embodiment. Friction hinges 140 may enable the 360 degrees of adjustable orientation of the solar panel around three axes of rotation. In one embodiment, friction hinges 140 may contain a three-hinge system, with hinge 140a attached to solar panel support, hinge 140c attached to tablet enclosure 130, and hinge 140b connected to both hinges 140a and 140c. Because hinges 140a-c provide 360 degrees of rotation relative to each other, friction hinges 140 may provide 360 degrees of adjustable orientation of the solar panel around three axes of rotation. Accordingly, the solar panel can be disposed in any angle and position adaptive to the angle of the light source.

Figure 6A:
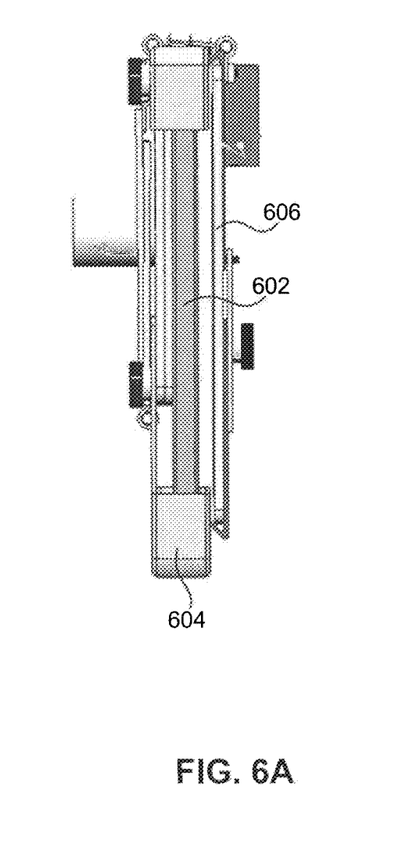
FIGS. 6A-B are side and perspective views of a tablet mounting system in a stored or fully folded configuration, according to an embodiment.

FIGS. 6A-7B are side and perspective views of a tablet mounting system in a stored configuration, according to an embodiment. For example, FIGS. 6A-B illustrate mounting a large tablet, such as a 10 inch one, in the mounting system. In the side view shown in FIG. 6A, tablet 602 is placed within tablet enclosure 604 in a stored configuration. Solar panel 606 is folded in an anterior position of tablet 602, serving as a front cover of tablet enclosure 604, while providing trickle charging to tablet 602 minimizing the need to be connected to a hard-wired power supply, depending on the orientation of a solar panel mounted within the solar panel support. Because tablet 602 is relatively larger in size, solar panel 606 only partially covers the tablet enclosure 604.

Figure 6B:
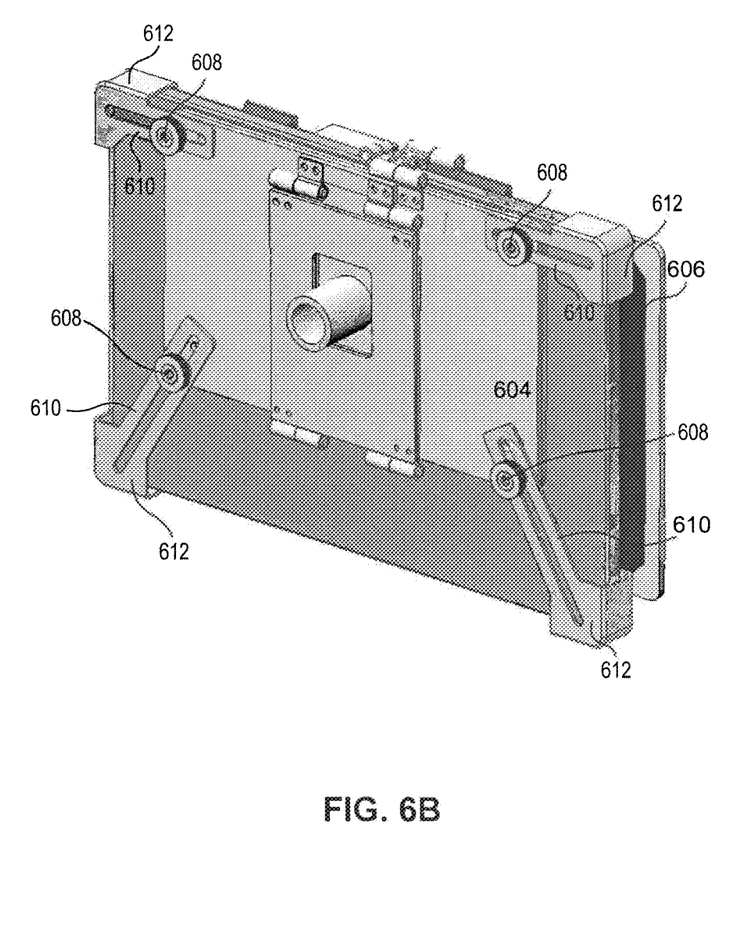

In the perspective view shown in FIG. 6B, tablet 602, depending on the orientation of the solar panel within the solar panel mount, is placed within tablet enclosure 604 in a stored configuration, with solar panel 606 serving as a front cover. Because the tablet, such as a 10 inch one, is relatively large in size, knob 608 on the beam member 610 is adjusted in a position relatively further away from its corresponding gripping portion 612 on tablet enclosure 604, to accommodate the larger size of tablet 602.

Figure 7A:
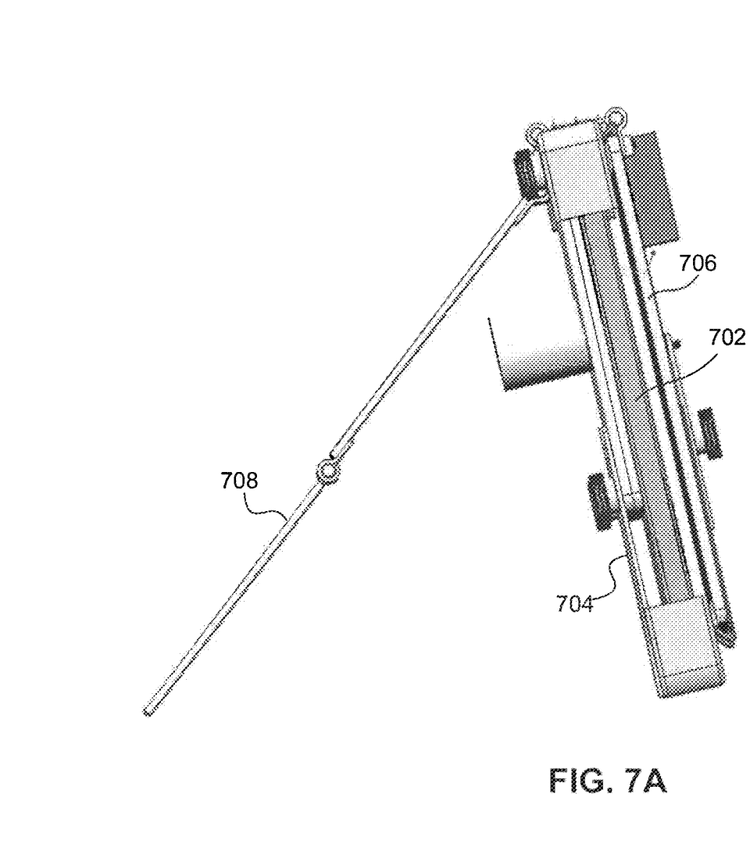
FIGS. 7A-B are side and perspective views of a tablet mounting system in a table mount configuration, according to an embodiment.
Figure 7B:
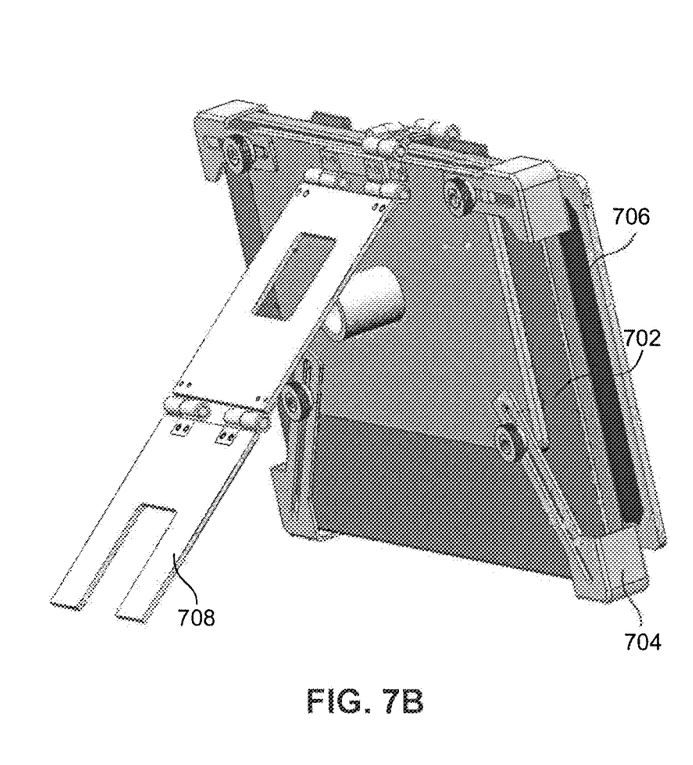

FIGS. 7A-B are side and perspective views of the tablet mounting system in a table mount configuration, according to an embodiment. For example, FIGS. 7A-B illustrate a mounting system suitable for mounting a 10 inch tablet in a table mount configuration. In the side view shown in FIG. 7A, tablet 702 is placed within tablet enclosure 704 in a table mount configuration. Solar panel 706 is folded in an anterior position of tablet 702, serving as a front cover of tablet enclosure 704, providing trickle charging to tablet 702 while it is running and minimizing the need to be connected to a hard-wired power supply, depending on the orientation of a solar panel mounted within the solar panel support. Table stand 708 is in a fully extended position providing support for tablet 702 on a flat surface.

In the perspective view shown in FIG. 7B, tablet 702 is placed within tablet enclosure 704 in a table mount configuration, with solar panel 706 serving as a front cover. Because in this example, the tablet is 10 inches in size, it is relatively large in size, and thus solar panel 706 may only partially cover tablet enclosure 704. Notably, table stand 708 is in a fully extended position, accommodating the larger size of tablet 702 and providing additional support for it on a flat surface.

Figure 8:
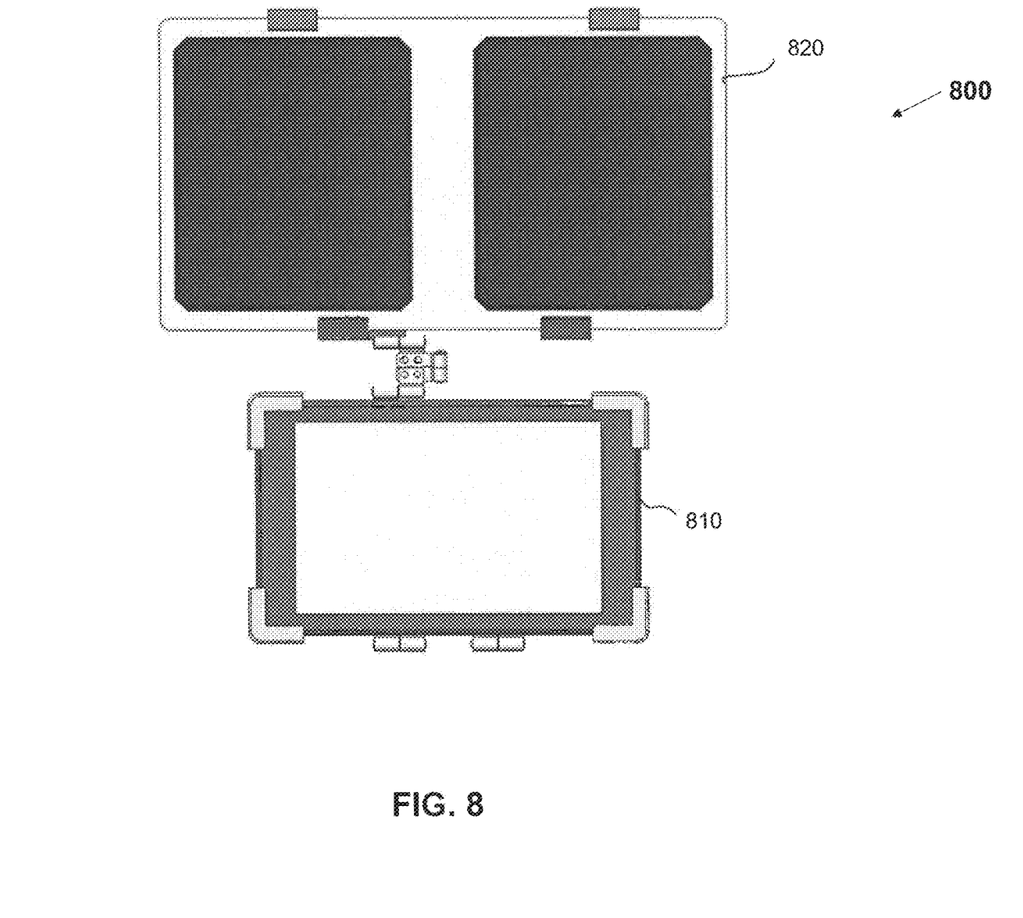
FIG. 8 illustrates a tablet mounting system, according to an embodiment.

FIG. 8 illustrates a tablet mounting system, according to an embodiment. System 800 includes a tablet 810 and a solar panel 820, which are coupled using the tablet mounting system discussed above. Solar panel 820 may provide continuous trickle charging to tablet 810, when the tablet is mounted in a table mount configuration, or a tripod mount configuration regardless when the tablet is in use, or depending on the configuration of the solar panel within the solar panel support, in a stored configuration.

Solar panel 820 may be a packaged, connected assembly of photovoltaic cells. Solar cells can be electrically connected and encapsulated as a module. According to some embodiments, photovoltaic modules may have a sheet of transparent material on the front or sun up side, allowing light to pass while protecting the semiconductor wafers from abrasion and environmental impact. Light absorbing materials can be used in multiple physical configurations to take advantage of different light absorption and charge separation mechanisms.

CONCLUSION

The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What claimed is:

1. A mounting system for a tablet computing device, comprising:
a tablet enclosure with a base plate, wherein the tablet enclosure includes a plurality of gripping portions adjustable to hold tablets of different sizes and shapes, and wherein each gripping portion is configured to grip a corner of the tablet computing device, wherein the base plate of the tablet enclosure includes a cylindrical connector, configured to removably couple to a tripod stand mount;
a solar panel support pivotally attached to the tablet enclosure through a plurality of friction hinges that are adjacently coupled, wherein the solar panel support is configured to hold a solar panel that provides trickle charging to the tablet computing device, and wherein the plurality of friction hinges provides a point of pivot between the solar panel support and the tablet enclosure to enable the held solar panel to adjustably orient relative to the tablet enclosure in three axes of rotation; and
a table stand, mounted to the tablet enclosure through a picture frame mount, that provides support to the tablet computing device on a flat surface with a wide range of viewing angles, wherein the picture frame mount includes a friction hinge that connects the table stand to the tablet enclosure, and wherein the picture frame mount includes an aperture large enough for the cylindrical connector to protrude through the picture frame mount when the picture frame mount is rotated, via the friction hinge, to align with the tablet enclosure.

2. The system of claim 1, wherein the cylindrical connector is further configured to couple to a tripod through a quick release seat post clamp or similar device for providing quick connection of the tripod to the tablet enclosure.

3. The system of claim 1, wherein the tablet enclosure includes dual functionality so that the tablet computing device is mountable to a table stand or to a tripod stand.

4. The system of claim 1, wherein the solar panel support is rotatable by 360 degrees for an optimal exposure to a light source.

5. The system of claim 1, wherein the solar panel support is configured to hold a range of sizes of solar panels.

6. The system of claim 1, wherein the friction hinges include a hinge configured to provide an axis of rotation to allow for either a portrait or landscape orientation of the tablet enclosure.

7. The system of claim 1, further comprising a stored configuration wherein the solar panel support is rotated via the point of pivot towards the tablet enclosure to use the held solar panel as a front cover of the tablet enclosure when the tablet computing device is not in use.

8. The system of claim 1, further comprising a table stand configuration wherein the solar panel support is rotated via the point of pivot away from the tablet enclosure in a position that exposes the tablet computing device to a user.

9. The system of claim 1, further comprising a tripod stand configuration wherein the tablet enclosure is mounted to a tripod or a similar device.

10. The system of claim 1, wherein the plurality of friction hinges includes a friction hinge that provides 360 degrees of rotation about one axis and other friction hinges that provide rotation less than 360 degrees about other axes of rotation.

11. A mounting system for a tablet computing device, comprising:
a solar panel support having a first clip configured to grip a side of a solar panel, and a second clip configured to grip an opposite side of the solar panel, wherein the first clip is adjustably coupled to the second clip through a beam member having a knob and a track, wherein the knob is slidable in the track to adjust a distance between the first clip and the second clip relative to each other, such that the solar panel support is adjustable by hand, and wherein the solar panel support enables the gripped solar panel to provide a continuous trickle charge to the tablet computing device;

a tablet enclosure including four gripping portions connecting to four beam members of the tablet enclosure, wherein each beam member of the tablet enclosure is adjustable by hand so that each gripping portion is configurable to hold and protect a corner of the tablet computing device, and wherein the tablet enclosure is configured to hold tablets of different sizes and shapes;

a cylindrical connector attached to a back plate of the tablet enclosure, wherein the cylindrical connector is configured to couple to a tripod stand mount, or a similar device; and a table stand mounted to the tablet enclosure through a picture frame mount, wherein the table stand provides support of the tablet computing device on a flat surface, wherein the solar panel support is pivotally attached to the tablet enclosure through a plurality of friction hinges that are adjacently, and wherein the plurality of friction hinges provides a point of pivot between the solar panel support and a table enclosure to enable the gripped solar panel to adjustably orient relative to the table enclosure in three axes of rotation, thereby enabling the solar panel to orient in any position based on an angle of the light source, wherein the picture frame mount includes a friction hinge that connects the table stand to the tablet enclosure, and wherein the picture frame mount includes an aperture large enough for the cylindrical connector to protrude through the picture frame mount when the picture frame mount is rotated, via the friction hinge, to align with the tablet enclosure.

12. The system of claim 11, wherein the plurality of friction hinges includes a three-hinge system.

13. The system of claim 11, wherein the tablet enclosure includes a dual functionality so that the tablet computing device is mountable to a table stand or a tripod stand, or a similar device.

14. The system of claim 11, wherein the picture frame mount includes a friction hinge that connects the table stand to the tablet enclosure, and wherein the friction hinge is coupled to the tablet enclosure proximate to the adjacently-coupled plurality of friction hinges.

15. The system of claim 11, wherein the four beam members are adjustably extendable from the table enclosure to hold tablets of various sizes and shapes.

* * * * *